Figure 1:
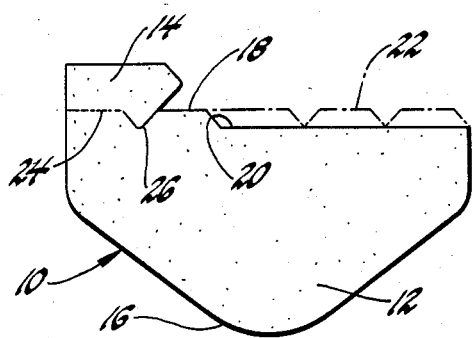

United States Patent [19]

Lis

[11] Patent Number: 4,588,916
[45] Date of Patent: May 13, 1986

[54] END TURN INSULATION FOR A DYNAMOELECTRIC MACHINE

[75] Inventor: Robert J. Lis, Willowbrook, Ill.

[73] Assignee: General Motors Corporation, Detroit, Mich.

[21] Appl. No.: 695,272

[22] Filed: Jan. 28, 1985

[51] Int. Cl.4 .............................................. H02K 3/46
[52] U.S. Cl. ................................................... 310/260
[58] Field of Search ............... 310/260, 270, 194, 208, 310/215, 179

[56] References Cited

U.S. PATENT DOCUMENTS

| | | | |
|---|---|---|---|
| 2,749,460 | 6/1956 | Acton et al. | 310/260 |
| 2,959,699 | 11/1960 | Smith et al. | 310/260 |
| 3,038,093 | 6/1956 | Needham et al. | 310/179 |
| 3,445,706 | 5/1969 | Drabik | 310/270 |
| 3,575,623 | 4/1971 | Stine | 310/260 |

Primary Examiner—Mark O. Budd
Attorney, Agent, or Firm—Mark A. Navarre

[57] ABSTRACT

A paper separator for insulating the stator winding end turns of a dynamoelectric machine at the point of their overlap. The paper is formed with a fold line and cut so that when the paper is properly folded and inserted between overlapping end turns, and a tie cord is tightened around the end turn bundle, the cord seats in a separator notch and bends a separator tab into engagement with one of the end turns to protect the winding insulation from damage due to contact with the cord.

4 Claims, 5 Drawing Figures

END TURN INSULATION FOR A DYNAMOELECTRIC MACHINE

This invention relates to dynamoelectric machines and more particularly to insulation for stator winding end turns thereof.

The term end turn as it pertains to the stator of a dynamoelectric machine refers to the curved portion of a stator winding which extends exteriorly of the stator slots. Two winding turns are generally inserted into each stator slot, and the end turns extending from adjacent stator slots crossover or overlap a short distance from the stator core. Although the windings are varnish coated, it is standard practice to provide additional insulation between the overlapping winding turns, especially in applications where there is a large winding to winding potential difference. In such applications, a winding separator of insulative paper generally triangular in shape is inserted between the overlapping winding turns, and the winding turns are then bound together with tie cords to prevent relative movement therebetween. Unfortunately, the tying operation also tends to degrade the insulation between winding turns at the point of overlap. This occurs because the tie cord tends to push the winding separator away from the stator core and also to damage the varnish coating of the winding at the point of their contact. In applications where the winding to winding potential difference is especially high, electrical arcing between adjacent windings at the point of their overlap may occur.

Accordingly, the object of the present invention is to provide an end turn separator of the general type described above which is easily insertable and which more effectively insulates winding end turn from each other at the point of their overlap.

The above object is carried forward according to this invention with a winding separator of flat insulative paper having a main portion generally conforming to the shape of a winding end turn and a dependent portion which extends in the plane of such main portion from the stator facing edge thereof. The interface between the main portion and the dependent portion is defined by a fold line along the stator facing edge of the main portion and a generally V-shaped cut extending from one end of the fold line into the body of the main portion. Before inserting the separator between overlapping stator end turns, the dependent portion is folded along the fold line against the main portion to thereby define a generally V-shaped notch in the main portion and a complementary tab in the dependent portion. The separator is then inserted between overlapping stator end turns such that the separator tab and notch are positioned adjacent the winding crossover between the crossover and the stator core. When the tie cord is passed between the separator notch/tab and the stator core and drawn up around the end turn bundle, the cord seats in the notch of the main portion and bends the tab of the dependent portion into engagement with the adjacent end turn. Since the cord seats in the notch, the separator is not pushed away from the stator core during the tying operation; since the cord bends the tab into engagement with the adjacent end turn, the tab is positioned between the cord and the end turn to increase the insulation between the end turns and protect the winding from damage by contact with the cord. The tightened cord secures the separator paper in place so that the insulation between the overlapping end turns is maintained, and the risk of insulation degradation and electrical arcing between windings is reduced.

In practice, the cord may be fed between the core and the paper separator in one of two directions: from a point radially outside the core to a point radially inside the core, or from a point radially inside the core to a point radially outside the core. Two embodiments of an end turn paper separator are contemplated by this invention, the first embodiment being suitable if the cord is fed from a point radially outside the core to a point radially inside the core and the second embodiment being suitable if the cord is fed from a point radially inside the core to a point radially outside the core. In each case, the paper separator of this invention has the same features and operates in the same or an analogous manner.

IN THE DRAWINGS

Figure 2:
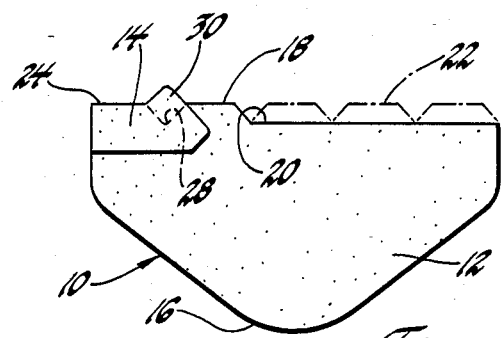

FIGS. 1 and 2 depict the first embodiment paper separator of this invention prior to its insertion between the overlapping end turns of a dynamoelectric machine. FIG. 1 depicts the separator prior to folding; FIG. 2 depicts the separator after folding.

Figure 3:
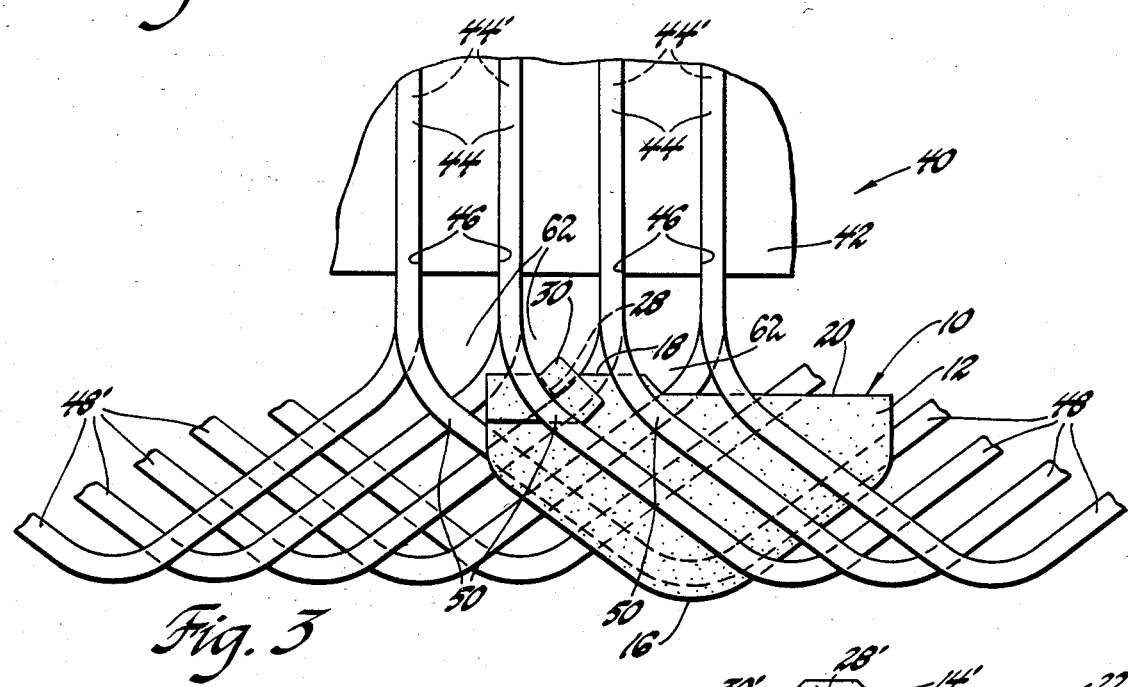
Figure 4:
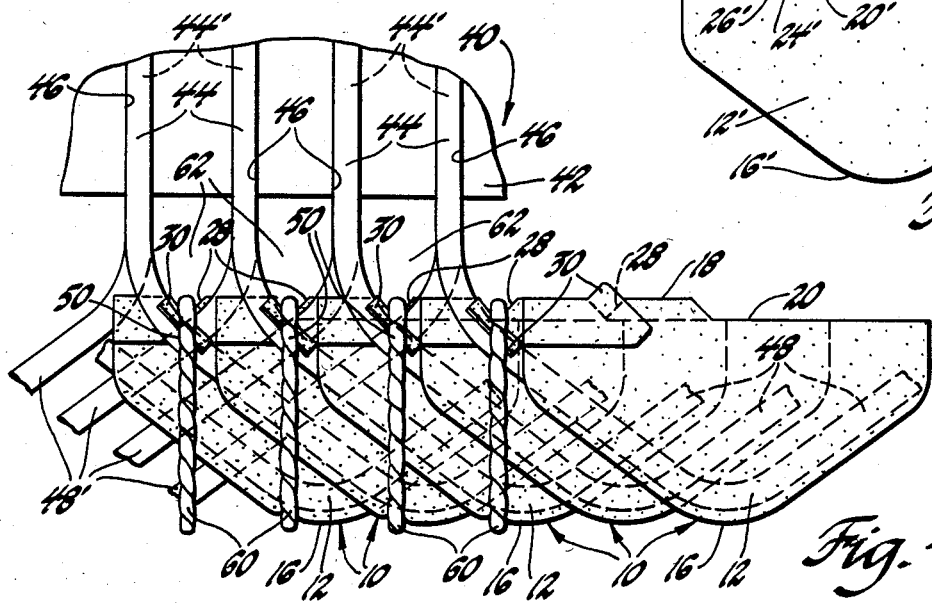

FIGS. 3 and 4 depict the first embodiment paper separator of this invention after insertion between the overlapping end turns of a dynamoelectric machine. FIG. 3 depicts the stator and separator prior to the tying operation; FIG. 4 depicts the stator and separator after the tying operation.

Figure 5:
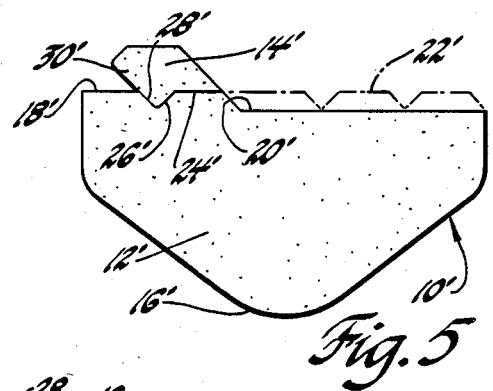

FIG. 5 depicts the second embodiment paper separator of this invention prior to folding.

Referring now to the drawings, and more particularly to FIGS. 1 and 2, the reference numeral 10 generally designates the end turn paper separator of this invention. Although a variety of materials may be used to form the separator, it is preferably formed of a fiber impregnated paper of the type currently marketed by DuPont Corporation under the tradename "Nomex". Essentially, the separator 10 comprises a main portion 12 and a dependent portion 14 extending therefrom. The main portion has a curved edge 16 which generally resembles the contour of a stator winding end turn and a substantially straight edge 18 which faces the stator core when the separator 10 is inserted between overlapping stator end turns. The edge 18 is cut back as indicated by the reference numeral 20 to facilitate the tying operation as will be understood in view of FIGS. 3 and 4, but may be extended and notched as indicated by the broken line 22, if desired. The interface between the main portion 12 and the dependent portion 14 is defined by a fold line 24 and a generally V-shaped cut line 26 which extends from one end of the fold line 24 into the main portion 12. While the cut is preferably V-shaped as shown for reasons which will become apparent, other cut shapes may be similarly useful. The fold line 24 is made by creasing or perforating the separator paper, while the cut line 26 is a physical cut of the separator paper.

Prior to insertion of the paper separator 10 between stator winding end turns, the dependent portion 14 is folded back against the main portion 12 along the fold line 24, as shown in FIG. 2. Such folding serves to define a generally V-shaped notch 28 in the main portion 12 and a complementary tab 30 in the dependent portion 14.

After the separator paper 10 has been folded along fold line 24 as shown in FIG. 2, it is inserted between overlapping stator winding end turns as shown in FIG. 3. Referring more particularly to that Figure, the reference numeral 40 generally designates the stator of a dynamoelectric machine including a slotted core 42 and a plurality of stator winding turns 44 and 44' disposed within the stator slots 46. Two stator winding turns 44, 44' are disposed within each slot 46, the lower or radially outward winding turns 44' being hidden by the upper or radially inward winding turns 44 in FIGS. 3 and 4. The upper and lower stator winding turns 44 and 44' have end turn portions 48 and 48' extending exteriorly of the stator core 42 before returning to a different stator slot, not shown. The upper winding of a given stator slot becomes the lower winding of the slot to which it is returned, and the lower winding of a given slot becomes the upper winding of the slot to which it is returned. Thus, upper and lower winding turns 44 and 44' of adjacent stator slots 46 crossover or overlap a short distance from the stator core 42, as indicated generally by the reference numerals 50. At such points, the winding end turns 48 and 48' pass in close proximity or touch each other. Although the winding turns 44, 44' are typically coated with varnish, the coating is thin and there is a danger of electrical arcing at the points of crossover 50 if such coating is damaged, as through rubbing contact with a tie cord, as described above.

The paper separator of this invention is inserted between overlapped end turn portions 48, 48' such that the notch 28 and complementary tab 30 lie adjacent the overlap point 50 between such overlap point 50 and the stator core 42. Put another way, the paper separator 10 is inserted such that the upper overlapping end turn 48 lies adjacent the dependent portion 14 in alignment with the edge of the notch 28 extending from the fold line 24. One separator paper 10 is inserted between end turns 48, 48' in the above manner at each point of overlap 50. To clearly illustrate the correct placement, only one such separator paper 10 is shown in FIG. 3.

FIG. 4 depicts the stator end turns 48, 48' and paper separators 10 after the tying operation is completed. The paper separators are inserted at each point of overlap 50 as described above, and tie cords 60 are fed through each space 62 between the stator core 42 and the tab/notch of a paper separator 10. When the cords are fed through the spaces 62 in a direction from a point radially outside the stator core 42 to a point radially inside the stator core 42, paper separators according to the first embodiment of this invention as depicted in FIGS. 1–4 are employed. In such case, the tightened cord is guided into the notch 28 of the separator main portion 12 and, in so doing, bends the tab 30 of dependent portion 14 into engagement with the upper end turn 48. When the tying operation is completed as shown in FIG. 4, the cords 60 are seated in the notch 28 and the tab 30 is interposed between the cord 60 and the upper end turn 48. As a result, the stator facing edge 18 of the paper separator 10 remains in position with respect to the stator core 42 and the tab 30 protects the upper stator winding end turn 48 from damage due to rubbing contact with the tie cord 60. At the axial ends of the stator assembly where the cords 60 engage the curved edge 16 of the paper separator 10, the paper 10 tends to bend radially outward around the end turn to protect it from rubbing engagement with the cord 60. Although FIG. 5 depicts a stator assembly having tie cords 60 between each stator slot 46, it may be adequate in certain other applications to use fewer tie cords 60.

As noted above, the use of a second embodiment paper separator 10' is appropriate if the tie cords 60 are fed through the spaces 62 in a direction from a point radially inside the stator core 42 to a point radially outside the stator core 42. Such a second embodiment paper separator is depicted in FIG. 5 in its initial form. In such figure, the reference numerals used in FIG. 1 have been repeated but primed to designate the analogous elements of the second embodiment. Thus, the second embodiment separator 10' comprises a main portion 12' and a dependent portion 14' extending therefrom. The main portion 12' has a curved edge 16' which generally resembles the contour of a stator winding end turn 48, 48' and a substantially straight edge 18' which faces the stator core 42 when the separator 10' is inserted between overlapping stator end turns 48 and 48'. The edge 18 is cut back as indicated by the reference numeral 20' but may be extended and notched as indicated by the broken line 22', if desired. The interface between the main portion 12' and the dependent portion 14' is defined by a fold line 24' and a generally V-shaped cut line 26' which extends from end of the fold line 24' into the main portion 12'. The fold line 24' is made by creasing or perforating the separator paper while the cut line 26' is a physical cut of the separator paper.

Prior to insertion of the paper separator 10' between the overlapping stator winding end turns 48, 48', the dependent portion 14' is folded forward against the backside of the main portion 12' as viewed in FIG. 5. As with the first embodiment paper separator 10 described in reference to FIGS. 1 and 2, such folding serves to define a generally V-shaped notch 28' in the main portion 12' and a complementary tab 30' in the dependent portion 14'. Also, as with the first embodiment paper separator 10, the second embodiment paper separator 10' is inserted between overlapping stator winding end turns 48 and 48' such that the notch/tab of the separator 10' lies adjacent the overlap point 50 between such overlap point 50 and the stator core 42. Put another way, the paper separator 10' is inserted such that the lower overlapping end turn 48' lies adjacent the dependent portion 14' in alignment with the edge of the notch 28' extending from the fold line 24'.

After all the paper separators 10' have been inserted, tie cords 60 are fed through the spaces 62 between the separators 10' and the stator core 42 in a direction from a point radially inside the stator core 42 to a point radially outside the stator core 42. As each such tie cord 60 is tightened around a respective stator end turn bundle, it is guided into the paper separator notch 28' and engages the separator tab 30' bending it radially outward against the lower stator end turn 48' at the respective overlap point 50. As a result, the position of the paper separator 10' relative to the stator core 42 is maintained during the tying operation and the separator tab 30' protects the lower stator winding end turn 48' from damage due to rubbing contact with the respective tie cord 60. Thus, the elements and function of the second embodiment paper separator 10' are the same as or analogous to that of the first embodiment paper separator 10 described in reference to FIGS. 1–4.

While this invention has been described in reference to the illustrated embodiments, it will be understood that various modifications thereto may occur to one skilled in the art and that such modified paper separators may fall within the scope of this invention which is defined by the appended claims.

The embodiments of the invention in which an exclusive property or privilege is claimed are defined as follows:

1. For a dynamoelectric machine having a slotted stator, a plurality of insulated stator windings supported by the stator slots such that winding end turns extending exteriorly of the stator from adjacent stator slots overlap before returning to different stator slots, such overlapping end turns being tied together with a cord at the point of overlap to prevent relative movement therebetween during operation of the machine, and winding separators inserted between overlapping end turns prior to the tying thereof for increasing the insulation therebetween, the improvement wherein:

the winding separator is formed of flat insulative material comprising a main body defined by a generally straight stator facing edge and a curved edge generally resembling the contour of a stator winding end turn, and a tab extending in the plane of said main body from the stator facing edge thereof, said tab being formed in part by a portion of said main body such that folding said tab back onto said main body along the stator facing edge thereof prior to insertion of the winding separator between the winding end turns operates to define a notch in said stator facing edge which is overlapped by a complementary portion of said tab, so that when the cord is tied around the winding end turns, it seats in the notch of the inserted winding separator and thereby bends the complementary tab portion into engagement with one of the overlapping winding end turns so that the complementary tab portion is positioned between the cord and the end turn, thereby providing increased insulation between the overlapping end turns and preventing the winding insulation from becoming damaged by contact with the cord.

2. A winding separator of the flat insulative type for insertion between the overlapping end turns of a dynamoelectric machine wherein the end turns are then bound together by a tie cord to prevent relative movement therebetween, the separator including a main portion and a dependent portion having an interface therebetween defined by a fold line and a generally V-shaped cut extending from one end of the fold line into the main portion so that the dependent portion may be folded along the fold line against the main portion to define a generally V-shaped notch in the main portion and a complementary tab in the dependent portion, and the separator may be inserted between two overlapping end turns such that one of the end turns is positioned adjacent the dependent portion in alignment with the edge of the notch in the main portion extending from the fold line, and the tie cord may be assembled such that the cord seats in the notch of the main portion and bends the tab of the dependent portion against the adjacent end turn as the cord is tightened thereby to position the tab between the tie cord and the end turn for providing increased insulation between the overlapping end turns and protecting the end turn insulation from damage caused by the tightened cord.

3. A winding separator of the flat insulative type for insertion between insulated stator winding end turns of a dynamoelectric machine at the point of their overlap wherein the overlapped end turns are then bound together by a tie cord to prevent relative movement therebetween, the separator including a main portion and a dependent portion having an interface therebetween defined by a fold line and a generally V-shaped cut extending from one end of the fold line into the main portion so that the dependent portion may be folded along the fold line in a radially inward direction with respect to the machine axis against the radially inward face of the main portion to define a generally V-shaped notch in the main portion and a complementary tab in the dependent portion, and the separator may be inserted between two overlapping end turns such that the radially inward end turn is positioned adjacent the dependent portion in alignment with the edge of the notch in the main portion extending from the fold line, and the tie cord may be fed between the separator notch and the machine stator in a radially outward to radially inward direction such that the cord seats in the notch of the main portion and bends the tab of the dependent portion against the radially inward end turn as the cord is tightened thereby to position the tab between the tie cord and the end turn for providing increased insulation between the overlapping end turns and protecting the end turn insulation from damage caused by the tightened cord.

4. A winding separator of the flat insulative type for insertion between the insulated stator winding end turns of a dynamoelectric machine at the point of their overlap wherein the overlapped end turns are then bound together by a tie cord to prevent relative movement therebetween, the separator including a main portion and a dependent portion having an interface therebetween defined by a fold line and a generally V-shaped cut extending from one end of the fold line into the main portion so that the dependent portion may be folded along the fold line in a radially outward direction with respect to the machine axis against the radially outward face of the main portion to define a generally V-shaped notch in the main portion and a complementary tab in the dependent portion, and the separator may be inserted between two overlapping end turns such that the radially outward end turn is positioned adjacent the dependent portion in alignment with the edge of the notch in the main portion extending from the fold line, and the tie cord may be fed between the separator notch and the machine stator in a radially inward to radially outward direction such that the cord seats in the notch of the main portion and bends the tab of the dependent portion against the radially outward end turn as the cord is tightened thereby to position the tab between the tie cord and the end turn for providing increased insulation between the overlapping end turns and protecting the end turn insulation from damage caused by the tightened cord.

* * * * *